United States Patent
Duponchel

(10) Patent No.: US 11,838,162 B2
(45) Date of Patent: Dec. 5, 2023

(54) METHOD FOR GENERATING A TRAINING SEQUENCE CONSISTING OF A PLURALITY OF OFDM SYMBOLS

(71) Applicant: SAFRAN DATA SYSTEMS, Courtaboeuf (FR)

(72) Inventor: Guillaume Duponchel, Biéville-Beuville (FR)

(73) Assignee: SAFRAN DATA SYSTEMS, Courtaboeuf (FR)

( * ) Notice: Subject to any disclaimer, the term of this patent is extended or adjusted under 35 U.S.C. 154(b) by 0 days.

(21) Appl. No.: 17/788,872

(22) PCT Filed: Dec. 24, 2020

(86) PCT No.: PCT/FR2020/052624
§ 371 (c)(1),
(2) Date: Jun. 24, 2022

(87) PCT Pub. No.: WO2021/130462
PCT Pub. Date: Jul. 1, 2021

(65) Prior Publication Data
US 2023/0046353 A1 Feb. 16, 2023

(30) Foreign Application Priority Data
Dec. 26, 2019 (FR) ..................... 1915625

(51) Int. Cl.
*H04L 27/26* (2006.01)
(52) U.S. Cl.
CPC .............. *H04L 27/2613* (2013.01)

(58) Field of Classification Search
CPC .............. H04L 27/2613; H04L 27/261; H04L 27/2602; H04L 27/2675
See application file for complete search history.

(56) References Cited

U.S. PATENT DOCUMENTS

2017/0111147 A1* 4/2017 Cao .................... H04L 27/2613

FOREIGN PATENT DOCUMENTS

WO WO 2007/073701 A1 7/2007

OTHER PUBLICATIONS

D'Amico et al., "Frequency Estimation in OFDM Direct-Conversion Receivers Using a Repeated Preamble," IEEE Transactions on Communications, vol. 64, No. 3, Mar. 2016, pp. 1246-1258.

(Continued)

Primary Examiner — Kevin Kim
(74) Attorney, Agent, or Firm — Birch, Stewart, Kolasch & Birch, LLP

(57) ABSTRACT

Method for generating an OFDM training sequence, device and computer program product. The OFDM training sequence consists of at least two OFDM symbols, and the OFDM training sequence comprises at least two OFDM sub-carriers, the method comprising a step of partitioning the OFDM sub-carriers into at least two separate groups comprising at least one sub-carrier, a number of groups being smaller than a number of sub-carriers. The method comprises steps, carried out independently for each group, of generating an elementary sequence associated with a group by combining the sub-carriers of the group, the elementary sequence having a duration equal to a duration of one of the at least two symbols.

13 Claims, 3 Drawing Sheets

(56) References Cited

OTHER PUBLICATIONS

French Preliminary Search Report and Written Opinion for French Application No. 1915625, dated Aug. 31, 2020.
International Search Report for International Application No. PCT/FR2020/052624, dated Apr. 22, 2021.

* cited by examiner

METHOD FOR GENERATING A TRAINING SEQUENCE CONSISTING OF A PLURALITY OF OFDM SYMBOLS

GENERAL TECHNICAL FIELD

The invention concerns the field of telecommunications, in particular those using Orthogonal Frequency Division Multiplexing (OFDM). The invention particularly concerns training sequences inserted into the waveform sent by a transmitter and then used by a receiver for time and frequency synchronization and channel equalization. It more particularly details a method for generating a family of training sequences comprising symbols modulated by OFDM modulation, a family having properties of particular interest for synchronization and equalization. Training sequences are also known as pilot sequences.

PRIOR ART

An OFDM symbol is composed of a plurality of subcarriers having frequency spacing df. In general, the subcarriers are modulated by codes $c_k$ belonging to a constellation (e.g. QAM or PSK) on each subcarrier indexed with k which typically varies from −N to N (i.e. 2N+1 subcarriers).

The complex envelope of the OFDM symbol is then in the form:

$$E(t) = \Sigma_k c_k e^{i2\pi(k \cdot df)t}$$

This is modulated on a carrier frequency $f_0$. The optimal duration of an OFDM symbol is then T=1/df called the gross duration of the OFDM symbol since all the subcarriers are orthogonal over this duration. The symbol is extended by a guard interval G which lasts a fraction of the period T (typically ¼, ⅛, even less). With P denoting the total duration of the OFDM signal, P=T+G, 1/P is the OFDM frequency symbol. This OFDM symbol is therefore transmitted fort between m·P and (m+1)P, where m is the index of the OFDM symbol.

The propagation channel between a transmitter and receiver is generally a channel of multi-path type. This type of channel occurs on account of a plurality of reflections of the radio wave transmitted between the transmitter and receiver. These reflections are caused for example by natural obstacles or buildings. The receiver, in addition to main reception of a radio signal, therefore also receives echoes spread over time of this same radio signal. The echo signals are generally attenuated or phase shifted relative to the main signal.

The OFDM waveform is particularly efficient when the propagation channel is of "multi-path" type and in particular when the time spread of its response for each path (the difference between the time of reception of the main signal and the time of reception of the last echo of this signal) is less than the guard interval G. Channel response is then nonzero solely between two delay values $R_{min}$ and $R_{max}$ with $R_{max} - R_{min} < G$. In this case, each subcarrier of the signal is received with stable amplitude and phase from $m \cdot P + R_{max}$ to $(m+1)P + R_{min}$ hence for a duration longer than T.

By denoting $h_k$ the channel response at frequency $f_0 + k \cdot df$ and $\Delta f$ the frequency offset of the receiver (i.e. the local oscillator of the receiver operates with a central frequency at $f_0 + \Delta f$), the receiver within this time interval receives a signal R(t) of complex envelope having the form:

$$R(t) = \Sigma_k h_k c_k e^{i2\pi(k \cdot df - \Delta f)t} + n(t)$$

where n(t) is additive Gaussian noise on reception which will be omitted in the remainder hereof.

So that the receiver is able to acquire and synchronize with said signal, it needs to identify the transition periods between the symbols (time synchronization) and the frequency offset with the transmitter (frequency synchronization). For determination of these elements, training sequences are incorporated i.e. a known signal portion transmitted recurrently, typically at each frame.

The most conventional training sequence is composed of codes $ts_k$ transmitted over some subcarriers of OFDM symbols ($ts_k = 0$ for the other subcarriers). These subcarriers are spaced apart by q times the OFDM frequency spacing df and occupy most of the available bandwidth. The sequence thus transmitted then received in a receiver before synchronization is periodic of period T/q to within a phase rotation. This system is used with q=4 and q=1 for so-called Short Training Sequences (STS) and so-called Long Training Sequences (LTS) in the wireless Wi-Fi network standard. The 4G Long Term Evolution (LTE) standard uses a similar system based on a Primary Synchronization Signal (PSS), but with a repetition period only equal to the guard interval of the OFDM symbols.

The training sequence is transmitted over a time longer than its cyclic period. In general, the receiver—for channel estimation and estimation of frequency offset—roughly synchronizes itself by first identifying this periodic repetition of the ODFM training sequence. By readjusting observed phase rotation on the cyclic period, the receiver synchronizes itself on a subcarrier of the signal and then calculates the Discrete Fourier Transform (DFT)) of the signal received over the period T/q. The spectrum obtained then has multiple frequency ambiguity of q·df which needs to be lifted. The DFT coefficients are then $x_k = h_{k-j} \cdot ts_{k-j}$ to within noise, with a frequency offset of j·q·df. The coefficients $y_k = x_k / ts_{k-i}$, then provide an estimation of $h_{k-i}$, when i=j. By selecting the proper index offset, the receiver is then able to determine channel response and hence proceed with equalization and time synchronization with an Inverse Fourier transform (IFT). However, to lift ambiguity, this needs to be performed for each potential frequency offset i·(q·df) in order to be able to select the most realistic channel response. If the number of subcarriers is high, this step therefore entails great complexity. The DVB-T broadcasting standard uses a binary pseudo-random sequence to determine activation or non-activation of the presence of a subcarrier in the different OFDM symbols of the training sequence. In this case, estimation of frequency ambiguity is performed by means of spectral recognition i.e. cross-correlation between the frequency spectrum of the received signal, obtained by taking the modulo of DFT coefficients, and that of the OFDM training sequence equivalent to the binary pseudo-random sequence. This cross-correlation gives a discriminating peak at the central position which therefore reproduces the auto-correlation property of the binary pseudo-random sequence. With this system, it is therefore possible to lift ambiguity before any calculation of channel response i.e. before performing an Inverse Fourier Transform which greatly simplifies calculations.

Other training sequence propositions using concatenation of several symbols have been described. In this case, use is made of the repetition of a symbol defined by the sequence of codes $ts_k$, with the inverse sequence (codes $-ts_k$), conjugate sequence (codes $ts_{-k}^*$) or time-inverted sequence (codes $ts_{-k}$), even the combination of several of these transforms. In general, these training sequences have a duration equal to an OFDM symbol, and the sequence symbol has a duration of T/2 or T/4, the cyclic period generally being T/2.

However, these training sequences have the disadvantage of frequency resolution being determined by the difference between the occupied subcarriers. This theoretical performance is therefore degraded when not all subcarriers are used since the channel response is not measured for each subcarrier and results have to be extrapolated. The ratio of occupied carriers is divided by 4 for example for STS of WiFi and by 2 for TS of DVB-T.

PCT application WO2007073701A1 is also known. This application describes a rapid Inverse Fourier Transform. However, this method does not allow the generation of an OFDM training sequence based on the partitioning of subcarriers.

There is therefore a need for the generation of OFDM training sequences which allow frequency synchronization via spectrum recognition whilst maximising the number of subcarriers used.

GENERAL DESCRIPTION OF THE INVENTION

The invention meets this need and in a first aspect proposes a method for generating an OFDM training sequence composed of at least two symbols, the OFDM training sequence comprising at least two OFDM subcarriers. The method comprises a step of partitioning the OFDM subcarriers into at least two separate groups comprising at least one subcarrier, a number of groups being smaller than a number of subcarriers. The method comprises steps, performed independently for each group, of generating an elementary sequence associated with a group by combining the subcarriers of the group, the elementary sequence having a duration equal to a duration of one of the at least two symbols, generating a multi-symbol sequence comprising at least one concatenation of the elementary sequence associated with the group, and phase or frequency offset, the method comprising a step to generate the OFDM training sequence via summation the multi-symbol sequences associated with all the groups.

This method offers the advantage of maximising the number of subcarriers able to be modulated, potentially up to all the subcarriers of the OFDM waveform. The discriminating property of the autocorrelation function of the sequence is therefore greater than that of sequences only using one carrier out of every two, and improves equalization. The sequence can also be chosen to be of cyclic period higher than T, which increases both the duration and the energy thereof and multiplies the number of lines in its spectrum thereby further increasing its discriminating property in the frequency domain. This proves to be most useful and allows much better performance when the channel has non-negligible frequency offset in relation to the frequency difference of two adjacent subcarriers, in particular for mobile communications.

The method for generating an OFDM training sequence can be implemented in the following manner.

In one embodiment, the generation of an elementary sequence associated with a group comprises the sub-steps of a choosing a complex code, characterized by an amplitude and a phase, for at least one subcarrier of the group, weighting the subcarrier with the chosen complex code to obtain a weighted subcarrier associated with the group, modulating the weighted subcarrier associated with the group by using an pulse associated with the group, to obtain an elementary sequence associated with the group.

In one embodiment, at least one group comprises at least two subcarriers and wherein the generation of an elementary sequence comprises the sub-steps of choosing two complex codes, characterized by an amplitude and a phase, for at least two subcarriers of the group, weighting the two subcarriers with the chosen complex codes, summating at least two weighted subcarriers of the group to form a composite symbol associated with the group, modulating the composite symbol associated with the group by using an pulse associated with the group to obtain an elementary sequence associated with the group.

In this embodiment, the elementary sequence associated with the group has the duration of a symbol.

In one embodiment, the generation of a multi-symbol sequence comprises the sub-steps of generating a concatenated sequence by concatenating the elementary sequence associated with the group with one or more copies and generating a multi-symbol sequence associated with the group by frequency offset of the concatenated sequence associated with the group.

In one embodiment, the generation of a multi-symbol sequence comprises the sub-steps of generating an offset sequence associated with the group by a phase offset or at least two successive phase offsets of the elementary sequence associated with the group, and generating a multi-symbol sequence associated with the group by concatenating the elementary sequence associated with the group with at least one phase offset copy.

In one embodiment, the generation of an OFDM training sequence further comprises a truncating step of at least one multi-symbol sequence, or a truncating step of the OFDM training sequence.

In one embodiment, a zero elementary sequence is associated with one of the groups.

In this embodiment, some subcarriers do not belong to any group, which amounts to considering that they form a new group associated with a null elementary sequence.

In one embodiment, the frequency offsets are different for each group.

In one embodiment, the frequency offsets are multiples of one same sub-multiple of an OFDM frequency spacing and/or the elementary sequences have a duration equal to a sub-multiple having a gross duration of the OFDM symbol.

In this embodiment, the elementary sequences are the symbols of the training sequence.

In one embodiment, the phase offset of the concatenated elementary sequence is repeated and the offset is applied to the whole concatenated elementary sequence.

In one embodiment, the pulses have a constant envelope and/or the pulses have the same power.

In one embodiment, the partitioning step uses a pseudo-random sequence.

There is also proposed, in another aspect of the invention, a device for generating an OFDM training sequence composed of at least two OFDM symbols, the OFDM training sequence comprising at least two OFDM subcarriers. The device comprises a data processing unit able to generate an OFDM training sequence and a transmission unit. The data processing unit is configured to perform a partitioning step of the OFDM subcarriers into at least two separate groups comprising at least one subcarrier, a number of groups being smaller than a number of subcarriers. The data processing unit is configured to perform steps, independently for each group, of generating an elementary sequence associated with a group by combining the subcarriers of the group, the elementary sequence having a duration equal to a duration of one of the at least two symbols, generating a multi-symbol sequence comprising at least one concatenation of the elementary sequence associated with the group and a phase or frequency offset. The data processing unit is configured to perform a step of generating the OFDM training sequence via summation of the multi-symbol sequences associated with all the groups.

There is also proposed, in another aspect of the invention, a computer programme product comprising programme code instructions to implement the steps of the method for generating an OFDM training sequence, when this programme product is executed by a processor.

There is further proposed, in another aspect of the invention, a transmitter or receiver using an OFDM waveform in which there is inserted a training sequence created by a device described above or a computer programme described above.

BRIEF DESCRIPTION OF THE DRAWINGS

Other characteristics and advantages of the invention will become further apparent from the following description which is nonlimiting and solely illustrative and is to be read in connection with the appended Figures.

DESCRIPTION OF ONE OR MORE EMBODIMENTS

An OFDM waveform transmitter transmits data frames to be used by a receiver. The transmitter regularly inserts training sequences into the waveform which help the receiver to synchronize in time and frequency and to equalize the transmission channel.

Figure 1:
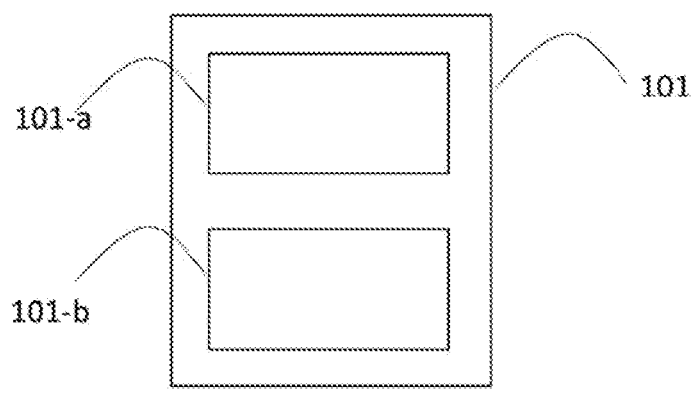
FIG. 1 illustrates a device according to one aspect of the invention.

FIG. 1 schematically illustrates a device 101 for generating an OFDM training sequence. This device 101 comprises a data processing unit 101-*a* able to generate and OFDM training sequence, and a transmission unit 101-*b* of the OFDM training sequence. The OFDM training sequence comprises a plurality of OFDM symbols and each OFDM symbol comprises a plurality of subcarriers. Typically, the data processing unit 101-*a* comprises at least one processor to implement a computer programme. This computer programme comprises programme code instructions to implement a method for generating an OFDM training sequence, when these instructions are executed by the processor of the data processing unit 101-*a*. Also, the device further comprises a memory to store in memory the OFDM training sequence inter alia. Typically, the transmission unit 101-*b* of the OFDM training sequence comprises a digital-analogue converter, a frequency converter, an amplification chain of the radio signal associated with the OFDM training sequence, and finally an antenna able to transmit the radio signal.

The OFDM training sequence is intended to be transmitted at each frame of an OFDM waveform signal, by the transmission unit 101-*b* in the same manner that it meanwhile transmits the signal containing useful data i.e. by modulating numerous subcarriers spaced by the frequency spacing df. The receiver uses the latter to acquire the signal and synchronize in time (start of frame) and frequency (resetting of its local oscillator). The OFDM training sequence also allows channel equalization at the time it is received. Equalization will be maintained by using the pilots transmitted between the training sequences.

The OFDM signal is designed to be robust against transmissions in a multi-path channel. It is sought to transmit the signal so that it is received error-free or quasi error-free, even though the channel has twofold dispersion; first in time, the delays of the different echoes have non-negligible time dispersion in relation to a symbol time; and in frequency, the different echoes being encumbered with non-negligible Doppler shift compared with the spacing between the subcarriers. The criticality of the channel is proven when the product of these two dispersions reaches a value typically close to or even exceeding one percent.

This case is encountered with long distance telecommunications for fast mobiles. It is particularly true for aircraft communications between the ground and an aircraft for example.

Figure 2:
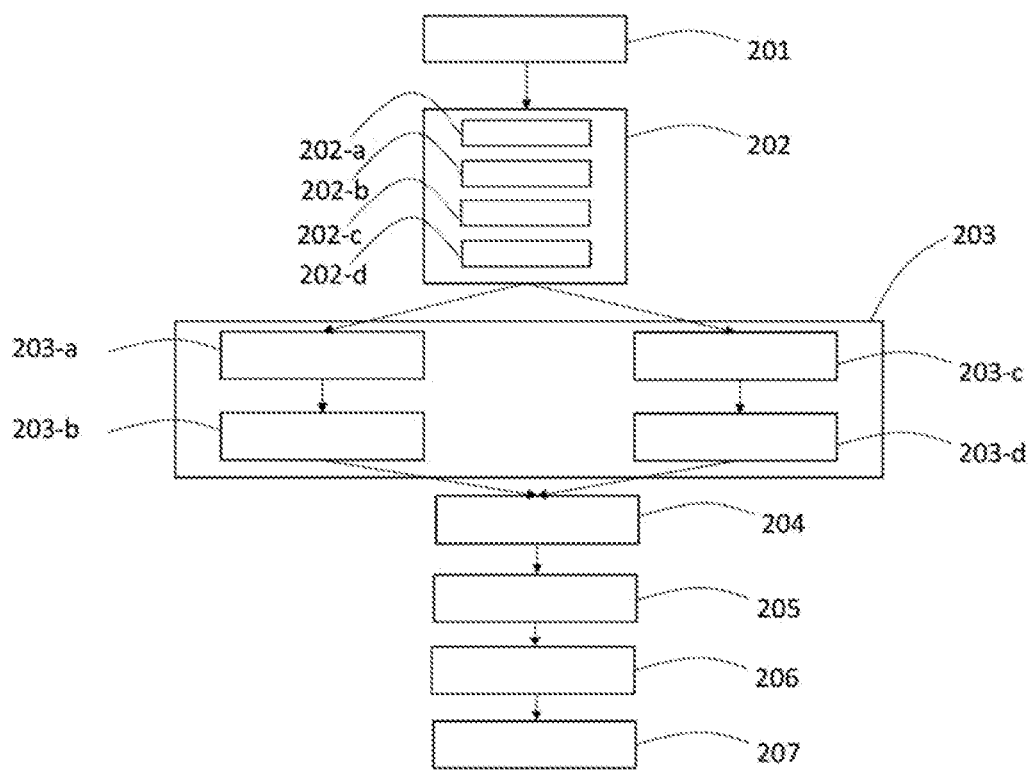
FIG. 2 illustrates a method for generating an OFDM training sequence according to another aspect of the invention.

With reference to FIG. 2, the device 101 for generating an OFDM training sequence illustrated in FIG. 1 is configured to implement the steps of:

partitioning 201 the OFDM subcarriers into at least two separate groups comprising at least one subcarrier;

After this partitioning, the method comprises the following steps performed independently for each group:

generating 202 an elementary sequence associated with a group, by combining the subcarriers of the group, the elementary sequence having a duration equal to the duration of the symbol. the duration possibly differing from the one used in the data frame; the generation step 202 comprising the sub-steps of:

choosing 202-*a* a complex code characterized by an amplitude and a phase, for at least one sub-carrier of the group weighting 202-*b* the subcarrier of the group with the chosen code, if the group comprises at least two subcarriers, the method comprises a summation step 202-*c* of the weighted subcarriers of the group to form the composite symbol associated with the group, modulating 202-*d* the composite symbol associated with the group or the weighted subcarrier, by using an pulse associated with the group to obtain a modulated symbol which forms the elementary sequence of the group.

In one embodiment of the partitioning step 201, some subcarriers are not associated with any group, these non-associated subcarriers are therefore not modulated which amounts to saying that they form a new group associated with null modulation or null weighting.

The method next comprises a step 203 to generate a multi-symbol sequence comprising at least one concatenation of the elementary sequence associated with the group with copy and frequency or phase offset. This generation step 203 is performed independently for each group. Two alternatives allow implementation of generation step 203:

In a first alternative, the method comprises:

generating 203-*a* a concatenated sequence associated with the group, by concatenation of the elementary sequence associated with the group, with its copy (copies), and generating 203-*b* a multi-symbol sequence associated with the group via frequency offset of the concatenated sequence associated with the group.

In a second alternative, the method comprises:
generating 203-*c* at least one phase offset elementary sequence associated with the group by phase rotations successively applied to one or more copies of the elementary sequence associated with the group, and
generating 203-*d* a multi-symbol sequence associated with the group, by concatenating the elementary sequence associated with the group with the elementary sequence(s) successively offset by phase accumulation.

Therefore, these two steps 203-*c* and 203-*d* allow the generation of a multi-symbol sequence via concatenation of one or more phase offset sequences by successive rotations of the elementary sequence associated with the group, which is equivalent to steps 203-*b* and 203*c* which frequency offset the concatenation of one or more copies without phase offset of the elementary sequence associated with the group.

These two alternatives allowing implementation of step 203 to generate a multi-symbol sequence allow one same multi-symbol sequence to be obtained, in that it can be considered that these two alternatives are equivalent.

From the set of multi-symbol training sequences that are optionally truncated, the method comprises a step 205 to generate the OFDM training sequence via summation of these multi-symbol sequences.

Optionally, the method may comprise a truncating step 206 of the OFDM training sequence.

The method may also comprise a step 207 to transmit the OFDM training sequence: This transmission can be performed by device 101 via the transmission unit 101-*b*.

Figure 3:
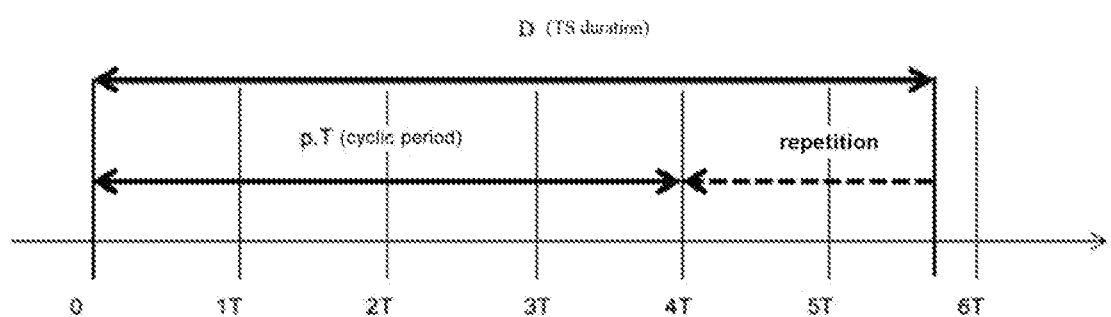
FIG. 3 illustrates the duration of an OFDM training sequence generated by the method of the invention, relative to the durations of the symbols.
Figure 4:
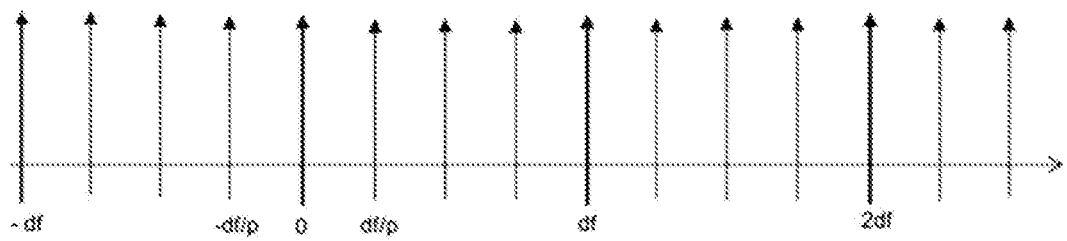
FIG. 4 illustrates the position of the spectral components of an OFDM training sequence generated by the method of the invention, when the cyclic period of this sequence is four times the duration of a symbol.

With this method i is possible to generate an OFDM training sequence conforming to the architecture of the transmitter since this method allows the generation of an OFDM signal on the same plurality of subcarriers. Up to step 203-*a*, the procedure constructs elements of training sequences having a cyclic period of a symbol of duration P, bearing in mind that this symbol period of the training sequence can differ from that of the useful data of the waveform. However, on account of the frequency offset step 203-*b*, the generated OFDM training sequence has a longer cyclic period and has richer spectral content via the presence of more numerous lines in the spectrum of the OFDM training sequence. This affords the advantage of improving accuracy of channel estimation by increasing spectral resolution, which is finally obtained since the OFDM training sequence is longer. This is of advantage when the channel has substantial Doppler spread, for example in the case of communication between two elements in motion relative to each other. More particularly, this method allows an increase in the cyclic period of the OFDM training sequence to n symbols which also increases the number of spectral components in the Fourier series. In one embodiment, the sequence has a duration denoted D=wP with w>n so that the transmitted signal indeed incorporates a repetition, however w is not necessarily an integer. FIG. 3 illustrates said OFDM training sequence. In this Figure, the OFDM training sequence lasts 5.75 OFDM symbols, and has a periodicity of 4 gross OFDM symbols. FIG. 4 illustrates the position of the spectral components, represented by arrows, in the OFDM training sequence when p=4.

In addition, when the frequency offsets differ between the groups of subcarriers then the spectra associated with each one have different spectrum occupancy repeated every n lines spaced by 1/nP. This property allows the application of a spectrum recognition algorithm to determine frequency synchronization and lift ambiguity, which simplifies calculations by avoiding having to calculate the Inverse Fourier Transform for each central frequency hypothesis.

This step is detailed below with its different embodiments.

The partitioning step 201 allows the creation of m separate groups of subcarriers, these groups intended to be modulated by separate pulses. In the simplest embodiment m is 2, but m can be a larger number. In conventional training sequences, m is 1 since the same modulation is applied to all the selected subcarriers. The remainder of the subcarriers not belonging to any of the m groups therefore remains non-modulated in the OFDM training sequences and can therefore be considered to be an additional group associated with null modulation. By denoting j any of the possible m values, $\psi_j$ then designates all the subcarrier indices of the group. In practice, it is better to create this partition by applying a pseudo-noise sequence PN to the indices of the subcarriers. Therefore, by denoting s(k) the value of the PN sequence with index k, the proportion of k verifying s(k)=j is equal to about 1/m and the proportion of k indices, for any d value, verifying s(k+d)=s(k) rarely exceeds 1/m. These properties enable the spectrum autocorrelation function of the OFDM training sequence to have a clearly distinct maximum at offset d=0, where this function equals the total number of modulated subcarriers i.e. no more than 2N+1. This guarantees the efficacy of the spectrum recognition algorithm for frequency synchronization.

For each group, the generation step 202 allows the constructing of an elementary sequence having the duration of a symbol P of the training sequence. At the first three sub-steps 202-*a*, 202-*b* and 202-*c*, linear combination is formed of the subcarriers having an index belonging to $\psi_j$. This operation is performed for each group j. The linear combination can use any amplitude and phase coefficients. Advantageously, the same and same unit amplitudes are used since the spectrum autocorrelation function will maintain the property of the pseudo random sequence used at the partitioning step 201. Advantageously, the phases are random to minimise the Peak-to-Average Power Ratio (PAPR) i.e. the ratio of peak power to average power of the composite signal obtained. For each group j, the composite signal $sc_j(t)$ has the following form:

$$sc_j(t) = \Sigma_{k \in \psi_j} z_k e^{i2\pi k \cdot df(t)}$$

where $z_k$ represents the weighting and $e^{i2\pi k \cdot df(t)}$ represents the subcarrier k.

This signal is then modulated at sub-step 202-*d* by an pulse of the duration of symbol P. The set of sub-steps 202-*a* to 202-*c* and sub-step 202-*d* are swappable. It is advantageous however first to perform the set of sub-steps 202-*a* to 202-*c* before sub-step 202-*d* since this minimises the complexity of calculations. The pulse for the group of index j is denoted $f_j$. The energy $E_m$ of the pulse is equal to:

$$\int_0^P f_j^2(t) dt = E_m$$

Preferably, this energy is taken to be equal to the mean of that of a code of the useful OFDM signal, but this value can nevertheless be varied according to the number of subcarriers used, so that the total power of the OFDM training sequence on arrival is close to that of the useful signal. In particular, it is advantageous for $f_j$ to be of constant envelope hence of complex modulation $\sqrt{E_m/P}$. For each group j, the elementary sequence $se_j(t)$ has the following form:

$$se_j(t) = f_j(t) \Sigma_{k \in \psi_j} z_k e^{i2\pi k \cdot df(t)}$$

For each group, the purpose of step 203 is to form a longer pulse using one or more repetitions of the elementary pulse.

At step 203-*a*, each elementary sequence is repeated r times with a delay each time of P to obtain a sequence of longer length than the total desired duration D (rP>D).

Between 0 and rP, the sequence obtained is the concatenation of identical portions of duration P, the concatenated sequence is therefore cyclic of period P. When the duration of symbol P differs from T, then the spectral lines of the concatenated sequence no longer coincide with the subcarriers. Advantageously, P therefore has the value of T, otherwise a sub-multiple T/q, to simplify the receiving algorithm since the spectral lines of the concatenated sequence will then coincide with the subcarriers. When q is greater than one, it is preferred to maintain in each group of index j only those subcarriers having an index that is a multiple of q so that the spectrum of the concatenated sequence coincides with the energy of the subcarriers used for construction thereof at step 202-a.

At step 203-b, each concatenated sequence is offset by a frequency $\delta_j$. When equated for each group of index j, steps 202 to 203 provide the following equation in which the function $ts_j(t)$ here designates the offset sequence associated with the group of subcarriers of index j:

$$ts_j(t)=e^{i2\pi\delta_j t}\Sigma_{l=0}^{r}[f_j(t-lP)\Sigma_{k\in\psi_j}z_k e^{i2\pi k \cdot df(t-lP)}]$$

It is also possible to reverse the order of steps 203-a and 203-b and thereby first perform a step 203-c phase offset of the elementary sequences, followed by a step 203-d to concatenate the phase offset sequences.

The preceding equation can effectively be converted to the following formula:

$$ts_j(t)=\Sigma_{l=0}^{r}[e^{il\varphi_j}\cdot g_j(t-lP)\Sigma_{k\in\psi_j}z_k e^{i2\pi k \cdot df(t-lP)}]$$

where $\varphi_j=2\pi\delta_j \cdot P$ is the phase rotation caused by frequency $\delta_j$ on period P and $$g_j(t)=f_j(t)e^{i2\pi\delta_j t}$$

i.e. $g_j(t)$ is the offset by frequency $\delta_j$ of modulation $f_j(t)$.

This formulation clearly suggests that the same multi-symbol sequences can be obtained by first repeating phase offset step 203-c via rotation of the elementary sequences, and then step 203-d to concatenate the sequences with accumulated phase offsets by phase $\varphi_j$.

When the values of $k \cdot df \cdot P$ are all integers, i.e. $P \cdot df=1/q$, or $P=T/q$, and when the k values of $\psi_j$ are multiples of q, then each delay by P rotates the subcarriers of the group by an integer number of rotations. The periodicity P of sequence construction has thereby been made congruent with that of the subcarriers which is T. The contribution of the repetition index I can henceforth be ignored in the argument of exponentials, which gives the following identities:

$$\Sigma_{k\in\psi_j}z_k e^{i2\pi k \cdot df(t-lP)}=\Sigma_{k\in\psi_j}z_k e^{i2\pi k \cdot df t} \Rightarrow ts_j(t)=$$
$$[\Sigma_{k\in\psi_j}z_k e^{i2\pi k \cdot df t}]u_j(t)$$

With:

$$u_j(t)=e^{i2\pi\delta_j t}\Sigma_{l=0}^{r}[f_j(t-lP)]=[e^{il\varphi_j}\cdot g_j(t-lP)]$$

The functions $u_j(t)$ here act as a single modulation individually applied to each subcarrier of index j.

Each spectrum of the composite signal obtained at step 202-c for the group of subcarriers j undergoes convolution with the spectrum of function $u_j$. Therefore, by choosing a different offset $\delta_j$ for each group j, the composite spectra formed of the lines corresponding to the subcarriers of the group are offset differently. It is therefore advantageous to have frequency offsets which differ for each group. It is also advantageous that they should be smaller than the frequency spacing df of the subcarriers of the OFDM symbol to limit spectrum offset.

The above equation suggests that when P=T/q and when the subcarriers of each group all have an index that is a multiple of q, then the following operations from 202 to 204 can be modified as follows: after sub-steps 202-a to 202-c of composite signal aggregation, concatenation step 203 can be applied and then offset only by function $f_j$, which allows function $u_j$ to be obtained, followed by application of sub-step 202-d for modulation of the composite signal.

In addition to the foregoing, it is most advantageous to ensure that the sequences obtained are cyclic and of same period so that it is possible to apply a Discrete Fourier Transform in the receiving algorithms. This is why it is chosen to have $\delta=1/nP$ with n being an integer higher than or equal to two, and values $\delta_j$ being multiples of $\delta$. The functions $u_j(t)$ then become cyclic functions of period nP. In practice, the index j is merged with this multiple which simplifies denotations. The spectra of the offset sequences are therefore separate insofar as all j values are also different modulo n. In practice, without this being necessary for good functioning of the invention, j is chosen to be between 0 and n−1 or −n/2 and +n/2 so that spectral offsets are minimal.

Figure 5A:
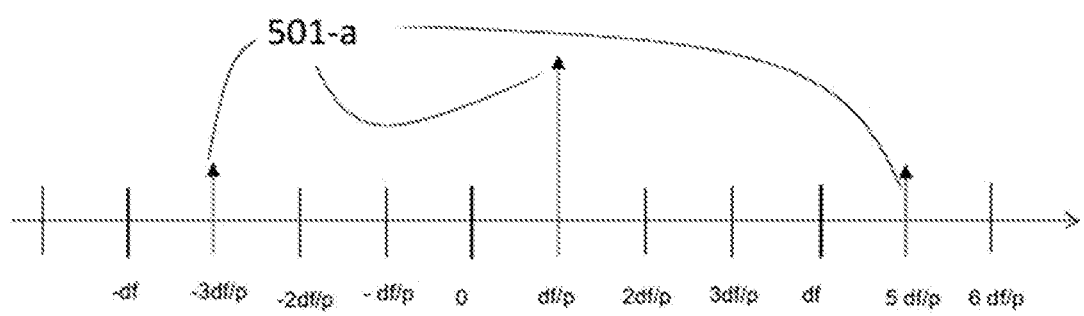
FIGS. 5-*a* and 5-*b* illustrate the spectral lines of multi-symbol training sequences generated by the method of the invention.
Figure 5B:
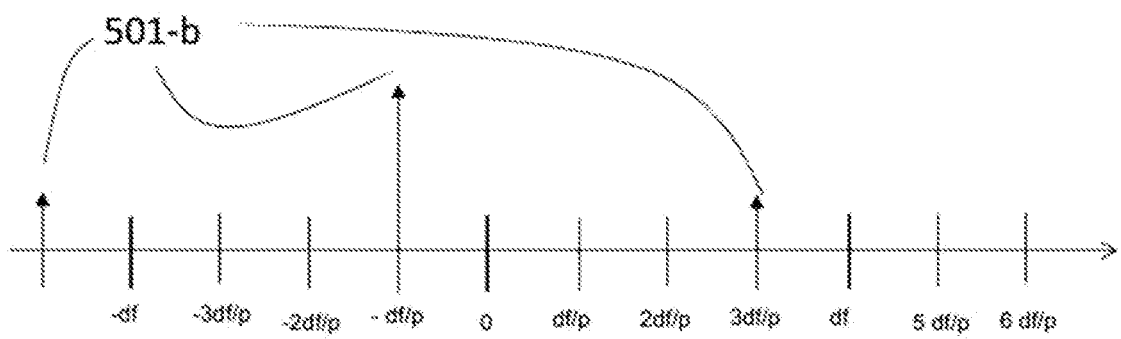

As a result, when the energy of the functions $u_j$ is concentrated on the continuous component, hence on the line of zero frequency, the spectral components of this function are concentrated at frequencies $(j+k \cdot n)\delta$ with $k\in\psi_j$. FIGS. 5-a and 5-b illustrate the spectral lines of $u_j(t)$ which are located at frequencies (j/n+k)df at 501-a and 501-b for q=1, p=4, and respectively j=1 in FIG. 5-a and j=3 or −1 in FIG. 5-b.

Finally, at step 204, each multi-symbol sequence is truncated to duration D (less than rP) before step 205 to generate the OFDM training sequence performed via summation of the multi-symbol sequences. The truncating step can also be performed after this step 205 to generate the OFDM training sequence. The equation describing complementary actions of steps 201 and 204 is written forts designating the OFDM training sequence:

$$ts(t)=1_{[0,D]}\Sigma_j ts_j(t)$$

The duration of the training sequence D can correspond to any number which is not a symbol integer. Advantageously, when D is longer than nP the receiving algorithm cam detect the cyclic repetition of the training sequence, and the longer it is the greater the time interval given to the algorithm between two detection attempts, which allows a reduction in the computing power needed on first detection of the training sequence.

It is advantageous in particular to use two types of modulations to generate the OFDM training sequence. The first, simplest, type is when the functions $f_j(t)$ equal 1 for all j indices. In this case, the offset sequences of group j are composed of the subcarriers of this group offset by frequency $j \cdot \delta$. The OFDM training sequence obtained is then perfect in that each modulation only contains a single frequency per OFDM subcarrier.

The second type is when the functions $g_j(t)$ equal 1 for all j indices i.e. $f_j(t)=e^{-i2\pi\delta_j t}$ In this case, modulation $f_j(t)$ cancels the subcarrier offset on each consecutive symbol period (k−1)P to kP (k<n), but the symbols undergo consecutive rotations of $\varphi_j$ at the transitions between symbols. This gives an OFDM training sequence composed of the sequence of codes $$e^{il\varphi_j}$$

with l ranging from 0 to r.

It is possible at step 201 that some subcarriers are not included in one of the groups of index j, which amounts to non-modulation thereof and to having a combination coefficient of zero value. This can concern the continuous line (this is often the case to allow the use of direct IQ modulators which have ill-controlled local oscillator leakage), or the subcarriers positioned at the ends of the spectrum (this provides an interval for carrier offset before initial acquisition of the signal), or any other sub-assembly of carriers when needed. In this case, the power loss of the sequence can be compensated by proportionally increasing the energy of the modulations.

It is also possible to choose subcarrier indices j having values different modulo n, but belonging neither to the interval 0,n−1 nor to interval −n/2, +n/2. The frequency offset of the modulations will then be different. The average offset of the spectrum is the barycentre of the indices j.

For indices j it is also possible to use numbers which are all half-integers. In this case, the sequence becomes anti-cyclic which means that it becomes self-opposing after period P. In this case, the OFDM training sequence has zero spectral offset for an even number of modulations of consecutive indices.

The concatenated sequences obtained at sub-step 203-a can be composed of several modulations, provided all these sequences have separate spectra i.e. obtained with different frequency offsets. To do so, an index j1 and index j2 can be used which, rather than designating separate subcarrier groups, designate fully identical groups. All the steps 201 to 203 take place in similar manner. On arrival, it is as if the group $\psi_{j1} = \psi_{j2}$ has been modulated by the function $u_{j1} + u_{j2}$. The sum of two or more modulations such as defined above therefore creates a new modulation which then has 2 or more main lines per subcarrier.

Finally, the main property of this OFDM training sequence is that the modulations transmitted on two different subcarriers are orthogonal to each other over a duration nP when the following conditions are met: P=T/q, k and k' multiples of q, $\delta_j = j \cdot \delta$ with $\delta = 1/nP$ and j modulo n are all different. The Hermitian product of two subcarriers of indices k and k' is:

$$\int_0^{nP} u_{s(k)}(t) u_{s(k')}(t) z_k z_{k'}^* e^{i2\pi(k-k')t/qP} dt$$

If s(k)=s(k')=j, then the product preceding the exponential equals $z_k z_{k'}^* |u_{s(k)}(t)|^2$ hence a constant when the modulation envelope is constant. It follows that a pure carrier of frequency (k−k')df is integrated with df=1/qP, which is equal to 0 when the subcarriers are different, therefore k≠k'. When s(k)≠s(k'), the Hermitian product of two subcarriers of indices [k and k'] is $$\int_0^{nP} \Sigma_{l=0}^{n-1} f_{s(k)}(t-lP) f_{s(k')}^*(t-lP) e^{i2\pi(k-k')t/qP} e^{i2\pi[s(k)-s(k')]t/nP} dt$$

The product preceding the exponentials is a cyclic function of period P, similar to the first exponential. As a result, the corresponding Fourier series only has terms at frequencies multiples of 1/P but none at frequencies j/nP with j a non-multiple of n. There is therefore no energy at frequency [s(k')−s(k)]/nP which means that this integral is null since it calculates the corresponding Fourier coefficient. And hence the Hermitian product is also null when s(k)≠s(k').

This characteristic of the offset training sequences allows training sequence energy to be obtained that is the sum of the energy of each subcarrier modulated by $u_j$, irrespective of the phases of each subcarrier and the chosen pseudo-noise sequence of the groups of subcarriers. The second consequence is that the spectrum of this sequence is the sum of the m separate spectra formed by the subcarriers of a group of index j. When, in addition, the function $f_j(t)$ has most of its energy concentrated on the continuous component, then this spectrum is chiefly composed of lines at frequencies (jq/n+k)df for the k multiples of q verifying s(k)=j. By writing k=qx with x an integer, the lines are therefore at frequencies [s(qx)/n+x)]/P. The line jq·df=s(qx)/P therefore forms the "main line" of modulation at the subcarrier of index k=qx.

Finally, the spectrum autocorrelation function of the training sequence is evaluated. If the correlation o(i+j/n)/P is offset, then the main lines coincide for (x+y)n+s[q(x+y)]−xn−s(qx)=j+in, therefore j+s(qx)=(y−i)n+s[q(x+y)]. This gives two cases: if j+s(qx)<n then y=i and s[q(x+i)]=j+s(qx), otherwise j+s(qx)≥n and then y=i+1 and s[q(x+i+1)]=j+s(qx)−n.

In both cases, if the sequence indeed has pseudo-random characteristics, then the probability of the event for given i and j is either zero when the desired main line of [j+s(k)] mod [n] does not belong to the set of m modulations, or is close to 1/m when it does belong to this set.

Therefore, the autocorrelation of the spectrum of the OFDM training sequence ts(t) has a high peak at zero representing the number of modulated subcarriers, and much lower secondary peaks typically divided by a factor m. The spectrum detection algorithm therefore works perfectly on the spectrum of the training sequence.

The invention claimed is:

1. A method for generating an OFDM training sequence composed of at least two symbols, the OFDM training sequence comprising at least two OFDM subcarriers, the method comprising a step of:

partitioning the OFDM subcarriers into at least two separate groups comprising at least one subcarrier, a number of groups being smaller than a number of subcarriers; the method comprising steps, performed independently for each group, of:

generating an elementary sequence associated with the group by combining the subcarriers of the group, the elementary sequence having a duration equal to a duration of one of the at least two symbols, generating a multi-symbol sequence comprising at least one concatenation of the elementary sequence associated with the group, and a phase or frequency offset, the generation of a multi-symbol sequence comprising the sub-steps of:

generating a concatenated sequence, by concatenating the elementary sequence associated with the group with at least one copy; and generating a multi-symbol sequence associated with the group by frequency offset of the concatenated sequence associated with the group, the method comprising a step of generating the OFDM training sequence via summation of the multi-symbol sequences associated with all the groups.

2. The method for generating an OFDM training sequence according to claim 1, wherein the generation of an elementary sequence associated with a group comprises the sub-steps of:

choosing a complex code characterized by an amplitude and a phase, for at least one subcarrier of the group, weighting the subcarrier with the chosen complex code to obtain a weighted subcarrier, modulating the weighted subcarrier associated with the group by using an pulse associated with the group, to obtain an elementary sequence associated with the group.

3. The method for generating an OFDM training sequence of claim 1, wherein at least one group comprises at least two subcarriers and wherein the generation of an elementary sequence comprises the sub-steps of:
choosing two complex codes characterized by an amplitude and a phase, for at least two subcarriers of the group,
weighting the two subcarriers with the chosen complex codes,
summating at least two weighted subcarriers of the group to form a composite symbol associated with the group,
modulating the composite symbol associated with the group by using a pulse associated with the group, to obtain an elementary sequence associated with the group.

4. The method for generating an OFDM training sequence of claim 1, wherein the generation of a multi-symbol sequence comprises the sub-steps of:
generating at least one offset sequence associated with the group by a phase offset copy or at least two successive phase offset copies of the elementary sequence associated with the group, and
generating a multi-symbol sequence associated with the group by concatenating the elementary sequence associated with the group with at least one phase offset copy.

5. The method for generating an OFDM training sequence of claim 1, further comprising a step of:
truncating at least one multi-symbol sequence, or
truncating the OFDM training sequence.

6. The method for generating an OFDM training sequence of claim 1, wherein a null elementary sequence is associated with one of the groups.

7. The method for generating an OFDM training sequence of claim 1, wherein the frequency offsets are different for each group.

8. The method for generating an OFDM training sequence of claim 1, wherein:
the frequency offsets are multiples of one same sub-multiple of an OFDM frequency spacing, and/or
the elementary sequences have a duration equal to a sub-multiple having a gross duration of the OFDM symbol.

9. The method for generating an OFDM training sequence of claim 1, wherein the phase offset of the concatenated elementary sequence is repeated and the offset is applied to the whole concatenated elementary sequence.

10. The method for generating an OFDM training sequence of claim 1, wherein:
the pulses have a constant envelope, and/or
the pulses have the same power.

11. The method for generating an OFDM training sequence of claim 1, wherein the partitioning step uses a pseudo-random sequence.

12. A device for generating an OFDM training sequence composed of at least two OFDM symbols, the OFDM training sequence comprising at least two OFDM subcarriers, the device comprising a data processing unit able to generate an OFDM training sequence, and a transmission unit,
the data processing unit being configured to perform a step of:
partitioning the OFDM subcarriers into at least two separate groups comprising at least one subcarrier, a number of groups being smaller than a number of subcarriers; the data processing unit being configured to perform steps, independently for each group, of:
generating an elementary sequence associated with a group, by combining the subcarriers of the group, the elementary sequence having a duration equal to a duration of one of the at least two symbols,
generating a multi-symbol sequence comprising at least one concatenation of the elementary sequence associated with the group, and a phase or frequency offset, the data processing unit being configured to perform a step of generating the OFDM training sequence via summation of the multi-symbol sequences associated with all the groups the generation of a multi-symbol sequence comprising the sub-steps of:
generating a concatenated sequence, by concatenating the elementary sequence associated with the group with at least one copy; and
generating a multi-symbol sequence associated with the group by frequency offset of the concatenated sequence associated with the group, the method comprising a step of generating the OFDM training sequence via summation of the multi-symbol sequences associated with all the groups.

13. A transmitter or receiver using an OFDM waveform in which there is inserted a training sequence created by a device according to claim 12.

* * * * *